T. MOORE.
SAFETY MILK BOTTLE CONTAINER.
APPLICATION FILED DEC. 14, 1915.

1,237,676.

Patented Aug. 21, 1917.
2 SHEETS—SHEET 1.

Witnesses:
H. S. Bull
B. G. Richards

Inventor,
Theodore Moore,
by Joshua R. H. Potts
his Attorney

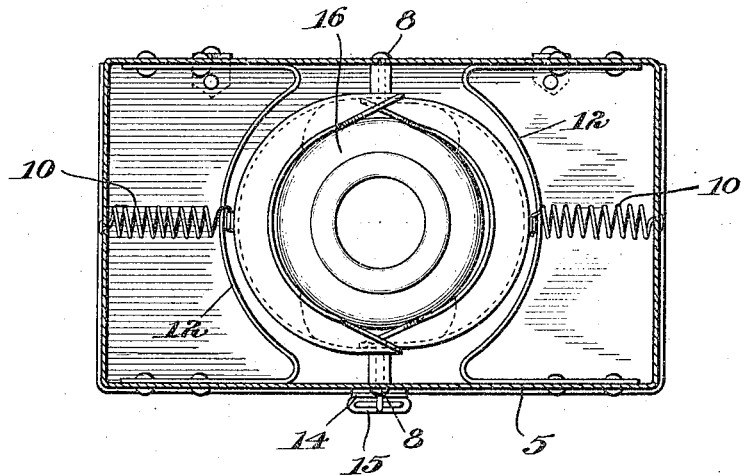
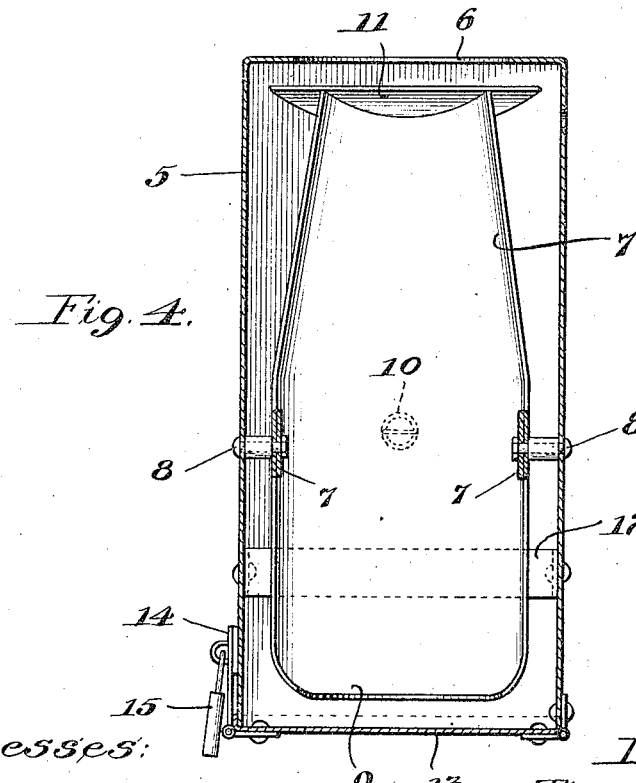

UNITED STATES PATENT OFFICE.

THEODORE MOORE, OF CHICAGO, ILLINOIS.

SAFETY MILK-BOTTLE CONTAINER.

1,237,676.  Specification of Letters Patent.  Patented Aug. 21, 1917.

Application filed December 14, 1915. Serial No. 66,691.

*To all whom it may concern:*

Be it known that I, THEODORE MOORE, a citizen of the United States, and a resident of the city of Chicago, county of Cook, and State of Illinois, have invented certain new and useful Improvements in Safety Milk-Bottle Containers, of which the following is a specification.

My invention relates to improvements in safety milk bottle containers and has for its object the provision of an improved construction of this character which is simple and efficient in use and will prevent the unauthorized removal of a milk bottle therefrom.

The invention consists in the combinations and arrangements of parts hereinafter described and claimed.

Figure 1:
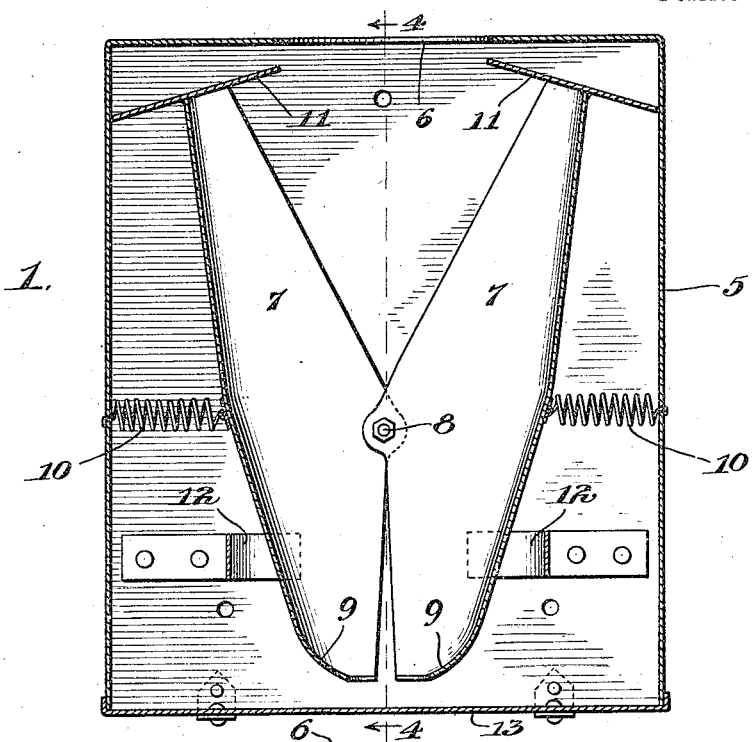
Figure 2:
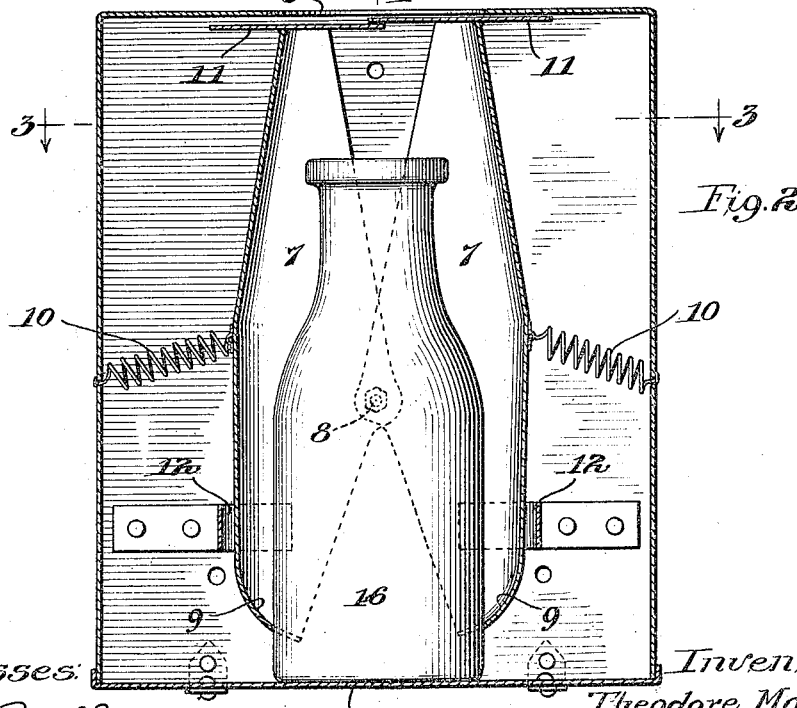

The invention will be best understood by reference to the accompanying drawings forming a part of this specification, and in which, Figure 1 is a vertical section of a container embodying my invention, Fig. 2 is a similar view showing a milk bottle therein, Fig. 3 is a section taken on line 3—3 of Fig. 2, and Fig. 4 is a section taken on line 4—4 of Fig. 1.

The preferred form of construction as illustrated in the drawings comprises a substantially rectangular sheet metal casing 5 adapted to be secured to a wall or other vertical supporting surface. The casing 5 is provided in its top with a circular entry opening 6 adapted to permit the insertion of a milk bottle therein and two coöperating semi-circular locking members 7 are pivotally mounted in said casing on studs 8 in position to receive and embrace an inserted milk bottle, the lower ends of said locking members being provided with inwardly extending cam surfaces 9 adapted to engage the lower edges of the inserted milk bottle and spread the lower ends of said locking members 7 apart upon insertion thereof as indicated in Fig. 2. Helical springs 10 are secured to the locking members 7 above their pivotal points and to the walls of casing 5 and serve to hold said locking members with their upper ends normally spread apart for the reception of a milk bottle. At their upper ends the locking members 7 are provided with heads 11 extending across the same, the inner portions of said heads serving to constitute a closure for the opening 6 when brought together and the outer portions thereof contact with the walls of casing 5 to limit the outward movement thereof. Substantially U-shaped braces 12 are secured across the lower portion of the casing 5 and serve to limit the outward swing of the lower portions of locking members 7. The bottom 13 of casing 5 is made in the form of a downwardly swinging door equipped with a hasp 14 and locked in closed position by means of a padlock 15.

The normal position of the parts is that indicated in Fig. 1. When a milk bottle 16 is inserted through opening 6 the lower ends of the locking members are spread apart automatically by the inserted bottle and their upper ends brought together to prevent unauthorized removal. When it is desired to remove the bottle all that is necessary is to release the door 13 and swing the same downwardly whereupon the bottle may be readily removed. The specific form and arrangement of the parts is a simple and efficient one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described comprising a casing having an opening in its top; two coöperating substantially semi-circular locking members pivotally mounted in said casing and having inwardly turned lower cam ends normally positioned therein with their lower ends adjacent and their upper ends spread apart, said lower ends being separated by a bottle inserted through said opening and said upper ends being equipped with means for closing said opening on being brought together; and a downwardly swinging locked door constituting the bottom of said casing, substantially as described.

2. A device of the class described comprising a casing having an opening in its top; two coöperating substantially semi-circular locking members pivotally mounted in said casing and having inwardly turned lower cam ends normally positioned therein with their lower ends adjacent and their upper ends spread apart, said lower ends being separated by a bottle inserted through said opening and said upper ends being equipped with means for closing said opening on being brought together; springs normally holding the upper ends of said locking members apart; and a downwardly swinging locked door constituting the bottom of said casing, substantially as described.

3. A device of the class described comprising a casing having an opening in its top; two coöperating substantially semi-circular locking members pivotally mounted in said casing and having inwardly turned lower cam ends normally positioned therein with their lower ends adjacent and their upper ends spread apart, said lower ends being separated by a bottle inserted through said opening; heads provided at the upper ends of said locking members and arranged to close said opening when said ends are brought together and to contact with the sides of said casing when said ends are separated; springs normally holding the upper ends of said locking members apart; substantially U-shaped braces extending across said casing and arranged to limit the outward swing of the lower ends of said locking members; and a downwardly swinging locked door constituting the bottom of said casing, substantially as described.

In testimony whereof I have signed my name to this specification in the presence of two subscribing witnesses.

THEODORE MOORE.

Witnesses:
JOSHUA R. H. POTTS,
ARTHUR A. OLSON.

Copies of this patent may be obtained for five cents each, by addressing the "Commissioner of Patents, Washington, D. C."